US008732350B2

(12) United States Patent
Vyshetski et al.

(10) Patent No.: US 8,732,350 B2
(45) Date of Patent: May 20, 2014

(54) METHOD AND SYSTEM FOR IMPROVING DIRECT MEMORY ACCESS OFFLOAD

(75) Inventors: Dmitry Vyshetski, Cupertino, CA (US); Howard Tsai, Cupertino, CA (US); Paul J. Gyugyi, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 441 days.

(21) Appl. No.: 12/340,494

(22) Filed: Dec. 19, 2008

(65) Prior Publication Data
US 2010/0161845 A1    Jun. 24, 2010

(51) Int. Cl.
*G06F 13/28* (2006.01)

(52) U.S. Cl.
USPC ............ 710/22; 710/25; 710/28; 711/147; 711/150

(58) Field of Classification Search
None
See application file for complete search history.

(56) References Cited

U.S. PATENT DOCUMENTS

| | | | | |
|---|---|---|---|---|
| 4,360,916 | A | 11/1982 | Kustedjo et al. | 714/759 |
| 5,343,481 | A | 8/1994 | Kraft | 714/782 |
| 5,533,035 | A | 7/1996 | Saxena et al. | 714/761 |
| 5,734,926 | A * | 3/1998 | Feeley et al. | 710/28 |
| 5,787,279 | A | 7/1998 | Rigoutsos | 707/700 |
| 5,878,279 | A * | 3/1999 | Athenes | 710/40 |
| 6,000,006 | A | 12/1999 | Bruce et al. | 711/103 |
| 6,760,743 | B1 | 7/2004 | Heddes et al. | 718/100 |
| 6,772,276 | B2 | 8/2004 | Dover | 711/103 |
| 6,985,977 | B2 * | 1/2006 | Vrancic | 710/59 |
| 7,100,103 | B2 | 8/2006 | Mizrachi et al. | 714/782 |
| 7,237,016 | B1 | 6/2007 | Schober | 709/223 |
| 7,386,683 | B2 * | 6/2008 | Blumrich et al. | 711/146 |
| 7,392,330 | B2 * | 6/2008 | Weatherspoon | 710/22 |
| 7,457,897 | B1 * | 11/2008 | Lee et al. | 710/74 |
| 7,603,523 | B2 * | 10/2009 | Blumrich et al. | 711/146 |
| 7,689,998 | B1 | 3/2010 | Chrysanthakopoulos | 718/104 |
| 7,761,636 | B2 | 7/2010 | Mott et al. | 710/240 |
| 7,877,254 | B2 | 1/2011 | Luan et al. | 704/250 |
| 7,877,524 | B1 * | 1/2011 | Annem et al. | 710/26 |
| 8,103,836 | B2 * | 1/2012 | Blumrich et al. | 711/146 |

(Continued)

FOREIGN PATENT DOCUMENTS

| | | | |
|---|---|---|---|
| EP | 0502211 | 9/1992 | G06F 12/10 |
| JP | 2004110436 A2 | 4/2004 | G06K 19/07 |
| JP | 2007034581 A2 | 2/2007 | G06F 12/06 |

OTHER PUBLICATIONS

'8237A High Performance Programmable DMA Controller' datasheet by Intel, Oct. 1989.*

(Continued)

*Primary Examiner* — Steven Snyder

(57) ABSTRACT

A system for improving direct memory access (DMA) offload. The system includes a processor, a data DMA engine and memory components. The processor selects an executable command comprising subcommands. The DDMA engine executes DMA operations related to a subcommand to perform memory transfer operations. The memory components store the plurality of subcommands and status data resulting from DMA operations. Each of the memory components has a corresponding token associated therewith. Possession of a token allocates its associated memory component to the processor or the DDMA engine possessing the token, making it inaccessible to the other. A first memory component and a second memory component of the plurality of memory components are used by the processor and the DDMA engine respectively and simultaneously. Tokens, e.g., the first and/or the second, are exchanged between the DDMA engine and the processor when the DDMA engine and/or the microcontroller complete accessing associated memory components.

20 Claims, 5 Drawing Sheets

(56) References Cited

U.S. PATENT DOCUMENTS

| | | | |
|---|---|---|---|
| 8,108,590 B2 | 1/2012 | Chow et al. | 711/103 |
| 2002/0078270 A1* | 6/2002 | Hofstee et al. | 710/23 |
| 2002/0161941 A1* | 10/2002 | Chue et al. | 710/22 |
| 2003/0172147 A1 | 9/2003 | Chang et al. | 709/223 |
| 2004/0044811 A1* | 3/2004 | Vrancic | 710/53 |
| 2004/0186946 A1 | 9/2004 | Lee | 711/103 |
| 2005/0057973 A1 | 3/2005 | Khatami et al. | 365/185.33 |
| 2005/0097183 A1 | 5/2005 | Westrelin | 709/212 |
| 2005/0160200 A1* | 7/2005 | Saito | 710/22 |
| 2005/0289253 A1* | 12/2005 | Edirisooriya et al. | 710/22 |
| 2006/0004931 A1* | 1/2006 | Weatherspoon | 710/22 |
| 2006/0136570 A1* | 6/2006 | Pandya | 709/217 |
| 2006/0152981 A1 | 7/2006 | Ryu | 365/194 |
| 2006/0236039 A1* | 10/2006 | Golander | 711/147 |
| 2007/0073920 A1* | 3/2007 | Wu et al. | 710/22 |
| 2008/0034153 A1 | 2/2008 | Lee et al. | 711/103 |
| 2008/0126684 A1 | 5/2008 | Wu et al. | 711/103 |
| 2008/0140910 A1* | 6/2008 | Flynn et al. | 711/100 |
| 2008/0250195 A1 | 10/2008 | Chow et al. | 711/103 |
| 2008/0270681 A1 | 10/2008 | Van Acht et al. | 711/103 |
| 2009/0002761 A1* | 1/2009 | La et al. | 358/1.16 |
| 2009/0070520 A1 | 3/2009 | Mizushima | 711/103 |
| 2009/0100307 A1 | 4/2009 | Lee | 714/746 |
| 2009/0150605 A1 | 6/2009 | Flynn et al. | 711/112 |
| 2009/0300318 A1 | 12/2009 | Allen et al. | 711/206 |
| 2010/0268864 A1 | 10/2010 | Ramiya Mothilal | 711/103 |
| 2011/0055668 A1 | 3/2011 | Kim et al. | 714/782 |

OTHER PUBLICATIONS

'Wikipedia—Microcontroller' article found on http://web.archive.org from Nov. 27, 2007.*

'Express Apps—PEX 8311' by PLX Technology, Jan. 2006.*

Advanced Semiconductor Memories Architecture, Designs, and Applications, Ashok Sharma, IEEE Press, 2003, at 393-401.

* cited by examiner

METHOD AND SYSTEM FOR IMPROVING DIRECT MEMORY ACCESS OFFLOAD

TECHNICAL FIELD

Embodiments of the present invention relate to the field of electronics. More particularly, embodiments of the present invention relate to a method and system for improving direct memory access (DMA) offload.

BACKGROUND ART

In general, a microcontroller may communicate commands to a direct memory access (DMA) circuit for execution. Larger commands may comprise smaller commands, e.g., subcommands. As a result, a DMA component may process, execute and/or modify the subcommands communicated by the microcontroller. In return, the DMA may communicate the data resulting from processing, executing and/or modifying the subcommands back to the microcontroller.

Unfortunately, using a memory component as an interface between a microcontroller and a DMA component can be inefficient and wasteful. For example, using a memory component as an interface enables either the microcontroller or the DMA to only have access to the memory component at any given time. In other words, the microcontroller and the DMA cannot have shared access to the memory component simultaneously. For example, the memory component is inaccessible to the DMA when the microcontroller is loading a subcommand to the memory component, thereby wasting DMA resources. Similarly, the memory component is inaccessible to the microcontroller when the DMA is accessing the memory component to load data resulting from processing, executing and/or modifying a subcommand previously loaded by the microcontroller, thereby wasting microcontroller resources.

Accordingly, the conventional system using memory as an interface between a processor and the DMA engine is wasteful because DMA resources are idle until the microcontroller completes accessing the memory component. Similarly, the microcontroller resources are idle until the DMA completes accessing the memory component. In other words, the conventional system is inefficient because the DMA resources are not utilized when a microcontroller is accessing the memory component and vice versa.

SUMMARY

Accordingly, a need has arisen to improve a DMA offload technique for supporting a microcontroller or other processor, thereby reducing the complexity of the scatter-gather data structures from firmware. Moreover, a need has arisen to reduce the memory and processor cycles required by the microcontroller firmware during a DMA offload. More specifically, a need has arisen to interleave data movement between a microcontroller and a DMA engine, e.g., a DMA component, to reduce latency, thereby improving the efficiency of the DMA offload. It will become apparent to those skilled in the art in view of the detailed description of the present invention that the embodiments of the present invention remedy the above mentioned needs and provide the above referenced advantages.

According to one embodiment of the present invention, a plurality of memory components is provided for improving the interface between a processor and a DMA component. The processor may be a microcontroller. The microcontroller is operable to select one or more commands for execution. The selected command may comprise subcommands that are communicated to the DMA component. The DMA component may utilize subcommands within memory components to perform a memory transfer operation. The DMA component may return the status of the memory transfer operation to the microcontroller.

The plurality of memory components may be a set of registers. Each memory component has a corresponding token associated therewith. A token is a data marker used to provide exclusive access to its associated memory component. For example, the microcontroller is given access to a memory component when the microcontroller has possession of the token associated with that memory component. Similarly, the DMA component is given access to a memory component when the DMA component has possession of the token associated with that memory component.

In other words, the microcontroller is operable to exclusively access a first memory component of the plurality of memory components when the microcontroller is in possession of a first token associated with the first memory component. As a result, the microcontroller may load a first DMA subcommand into the first memory component when the microcontroller is in possession of the first token. It is appreciated that the first memory component is inaccessible to the DMA component when the microcontroller is in possession of the first token and vice versa.

Simultaneously, the DMA component may have possession of a second token associated with a second memory component of the plurality of memory components. As a result, the DMA component is operable to access the content of the second memory component, e.g., a second DMA subcommand previously loaded by the microcontroller. Moreover, the DMA component is operable to process, execute and modify the content of the second memory component, e.g., by executing the second DMA subcommand stored in the second memory component to perform the prescribed memory operation.

Accordingly, while the microcontroller is loading the first subcommand in the first memory component, the DMA component is processing the second subcommand stored in the second memory component. Therefore, the microcontroller and the DMA component are utilized simultaneously, thereby improving system efficiency and DMA offload.

It is appreciated that any number of memory components may be utilized. For example, 8 memory components may be used with their 8 respective tokens. It is appreciated that the microcontroller and the DMA component are each capable of carrying out multiple commands, subcommands and operations simultaneously. For example, the DMA component may be in possession of three tokens, thereby having access to and processing three memory components associated with those tokens, enabling the DMA component to carry out the memory transfer operations associated with the subcommands simultaneously. Similarly, the microcontroller may be in possession of multiple tokens, thereby having access to multiple memory components, enabling the microcontroller to load multiple subcommands simultaneously.

According to one embodiment, the first token is passed to the DMA component when the microcontroller completes accessing the first memory component associated with the first token, e.g., when the microcontroller loads the first subcommand in to the first memory component. It is appreciated that the second token for the second memory component may be passed to the microcontroller when the DMA component completes accessing the second memory component and performing the DMA command therein, e.g., processing, executing and/or modifying the second subcommand to perform the memory operation. Results of the memory operation, e.g., error codes, etc. may be stored in the memory component upon the token being passed back to the microcontroller. Tokens associated with other memory components may also be exchanged between the microcontroller and the DMA component when the microcontroller and/or DMA component complete accessing memory components associated with those tokens. As a result, the microcontroller and the DMA component are utilized simultaneously, thereby increasing parallelism in the system in comparison to the conventional system where one component is required to wait for the other component to complete its operation, thereby wasting time and resources.

More particularly, a system for improving DMA offload includes a microcontroller, a data DMA engine and a plurality of memory components. The microcontroller is operable to select an executable command. The DDMA engine is operable to process a plurality of subcommands of the executable command. The plurality of memory components is operable to store the plurality of subcommands and status data resulting from processing of the plurality of subcommands. Each of the plurality of memory components has a corresponding token associated therewith. Possession of a token allocates its associated memory component either to the microcontroller or the DDMA whichever possesses the token. A first memory component and a second memory component of the plurality of memory components are operable for use by the microcontroller and the DDMA respectively and simultaneously depending on the ownership of the associated tokens.

According to one embodiment, the state of each memory component may be non-allocated, allocated and processed by the microcontroller, and processed by the DDMA engine. The plurality of memory components may be a set of registers.

According to one embodiment, when constructing commands a first portion of content of a memory component of the plurality of memory components is operable to be copied from a different memory component of the plurality of memory components. A second portion of the content of a memory component is operable to be loaded from a template.

In one embodiment, a first token corresponding to the first memory component is passed by the microcontroller to the DDMA engine when the microcontroller loads a subcommand in the first memory component. Possession of the first token by the DDMA engine enables the DDMA engine to access the first memory component to carry out a memory operation and execute the DMA command. The first memory component becomes inaccessible to the microcontroller during the time that the DMA engine accesses the first memory component.

In one exemplary embodiment, a second token corresponding to the second memory component is passed by the DDMA engine to the microcontroller when the DDMA loads data in the second memory component. Possession of the second token by the microcontroller enables the microcontroller to access and modify a content of the second memory component and make the second memory component inaccessible to the DDMA engine.

According to one embodiment, the microcontroller determines that execution of a last subcommand of the executable command is complete. As a result, the microcontroller in response thereto transmits a reset signal to clear a memory address storing the executable command.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
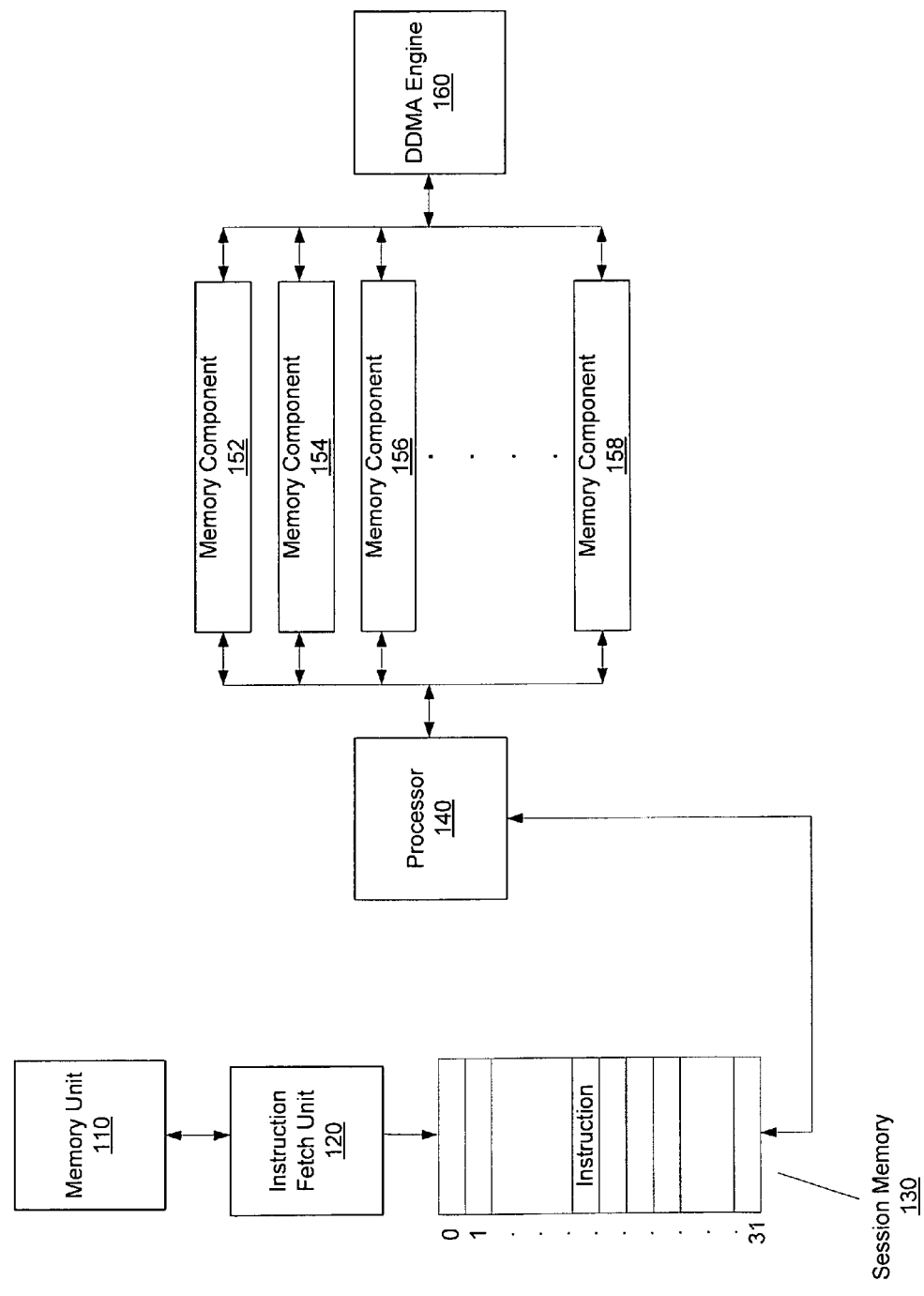
FIG. 1 shows an exemplary system in accordance with one embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on television set memory. These descriptions and representations are the means used by those skilled in the art to most effectively convey the substance of their work to others skilled in the art. A procedure, a microcontroller set executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "creating" or "transferring" or "passing" or "loading" or "modifying" or "executing" or "determining" or "instructing" or "issuing" or "clearing" or "accessing" or "aggregating" or "obtaining" "fetching" or "selecting" or "calculating" or "measuring" or "querying" or "receiving" or "sending" or "providing" or "storing" or "displaying" or "rendering" or the like, refer to the action and processes of a television set, or similar electronic computing device, that manipulates and transforms data represented as physical (electronic) quantities within the television set's registers and memories into other data similarly represented as physical quantities within the television set memories or registers or other such information storage, transmission or display devices.

A Method and System for Improving Direct Memory Access Offload

FIG. 1 shows an exemplary system 100 in accordance with one embodiment of the present invention. The system 100 includes a memory unit 110, an instruction fetch unit 120, a session memory 130, a processor 140, e.g., microcontroller, a plurality of memory components 152, 154, 156 and 158, e.g., a set of registers, and a data direct memory access (DDMA) engine 160. The memory unit 110 stores instructions, commands and data. The instruction fetch unit 120 fetches one or more commands from the memory unit 110 and stores it in the session memory 130. The processor 140 may use an optimization heuristic to select one or more executable commands from the plurality of commands stored in the session memory 130.

One or more selected executable commands are communicated to the DDMA engine 160 for processing via the plurality of memory components 152, 154, 156 and/or 158. The plurality of memory components may be separate and/or external to the processor 140 and the DDMA engine 160. It is appreciated that any number of memory components may be used and that the number of memory components shown is for illustration purposes only and not intended to limit the scope of the present invention. Moreover, it is appreciated that the session memory 130 may store any number of commands and that 32 as shown is for illustration purposes and not intended to limit the scope of the present invention.

Each memory component has a data token associated therewith. For example, the memory component 152 has a token associated therewith, the memory component 154 has a token associated therewith, etc. Possession of a token by either the processor 140 or the DDMA engine 160 provides exclusive access to the memory component associated with that token.

In one embodiment, the processor 140 has exclusive access to the memory component 152 when the processor 140 has possession of the token associated with the memory component 152. Similarly, the DDMA engine 160 has exclusive access to the memory component 152 when the DDMA engine 160 has possession of the token associated with the memory component 152. In one exemplary embodiment, the processor 140 has exclusive access to the memory component 152 when the processor 140 has possession of the token associated with the memory component 152, while the DDMA engine 160 has exclusive access to the memory component 154 when the DDMA engine 160 has possession of the token associated with the memory component 154. In other words, different memory components may be used by the DDMA engine 160 and the processor 140 simultaneously based on token ownership. According to one embodiment, eight memory components and eight tokens associated therewith may be used in order to enable eight operations by the processor 140 and the DDMA engine 160 simultaneously.

An executable command may include multiple subcommands. At the beginning of the processing, the processor 140 may have possession of all the tokens associated with the memory components. For example, the processor 140 may have possession of the token associated with the memory component 152, the token associated with the memory component 154, the token associated with the memory component 156 and the token associated with the memory component 158.

Accordingly, the processor 140 may start loading subcommands in to the memory components. For example, the processor 140 may start loading a subcommand in to the memory component 152, a different subcommand in to the memory component 154, etc. The token associated with a particular memory component is passed to the DDMA engine 160 when the processor 140 completes accessing that particular memory component. For example, the token associated with the memory component 154 may be passed to the DDMA engine 160 when the processor completes accessing the memory component 154, e.g., completes loading a subcommand into memory component 154.

It is appreciated that the processor 140 may still possess tokens associated with other memory components. Therefore, the processor 140 has access to some memory components while the DDMA engine 160 may have access to other memory components simultaneously. For example, the processor 140 may have possession of tokens associated with the memory components 152, 156 and 158 while the token associated with the memory component 154 is passed to the DDMA engine 160. Accordingly, the processor 140 and the DDMA engine 160 have access to different memory components simultaneously, thereby increasing parallelism and efficiency.

According to one embodiment, the DDMA engine 160 carryout a memory operation and execute a DMA command when the DDMA engine 160 has possession of the token associated with the memory component 154. For example, the DDMA engine 160 may apply an error correcting code, encryption, decryption, etc., to the subcommand stored in the memory component. The processor 140 may track the subcommand and/or command being currently processed by the DDMA engine 160.

The DDMA engine 160 may load status data resulting from executing the DMA command stored in that memory component, e.g., memory component 154. According to one embodiment, the DDMA engine 160 may have possession of multiple tokens, thereby having access to multiple memory components simultaneously. As such, the DDMA engine 160 may process and operate on multiple subcommands, commands or any combination thereof simultaneously. The token associated with the memory component 154 is passed back to the processor 140 when the DDMA engine 160 completes accessing the memory component 154. For example, the token associated with the memory component 154 is passed back to the processor 140 when the DDMA engine 160 finishes loading data in to the memory component 154.

It is appreciated that the processor 140 may conclude that the second subcommand previously loaded in the memory component 154 has been processed by the DDMA engine 160 when the processor 140 receives the token associated with the memory component 154 from the DDMA engine 160. In one embodiment, the information regarding the status and the operation performed when executing the second subcommand is provided to the processor 140 in the memory component 154 when the token associated with the memory component 154 is passed to the processor 140.

The processor 140 may load a new subcommand in the memory component 154 when it receives the token associated with the memory component 154. It is appreciated that the exchange of the tokens between the processor 140 and the DDMA engine 160 may continue until all subcommands are processed. Thereafter a new command with its corresponding subcommands may be similarly processed. It is appreciated that the use of subcommands are exemplary and not intended to limit the scope of the present invention. For example, the above described system is equally applicable to processing of various commands simultaneously and/or a combination of commands and subcommands.

Accordingly, resources of the processor 140 and the DDMA engine 160 are used simultaneously, thereby increasing parallelism and efficiency. Moreover, the processor 140 may modify the data and abstract the driver interface from the flash implementation in order to provide read-modify-write operations or scattered data among several locations to appear continuous. In other words, the plurality of memory components hides the complexity of the scatter data structures from the firmware, thereby reducing the memory and the processor cycles needed by the processor 140.

Figure 2A:
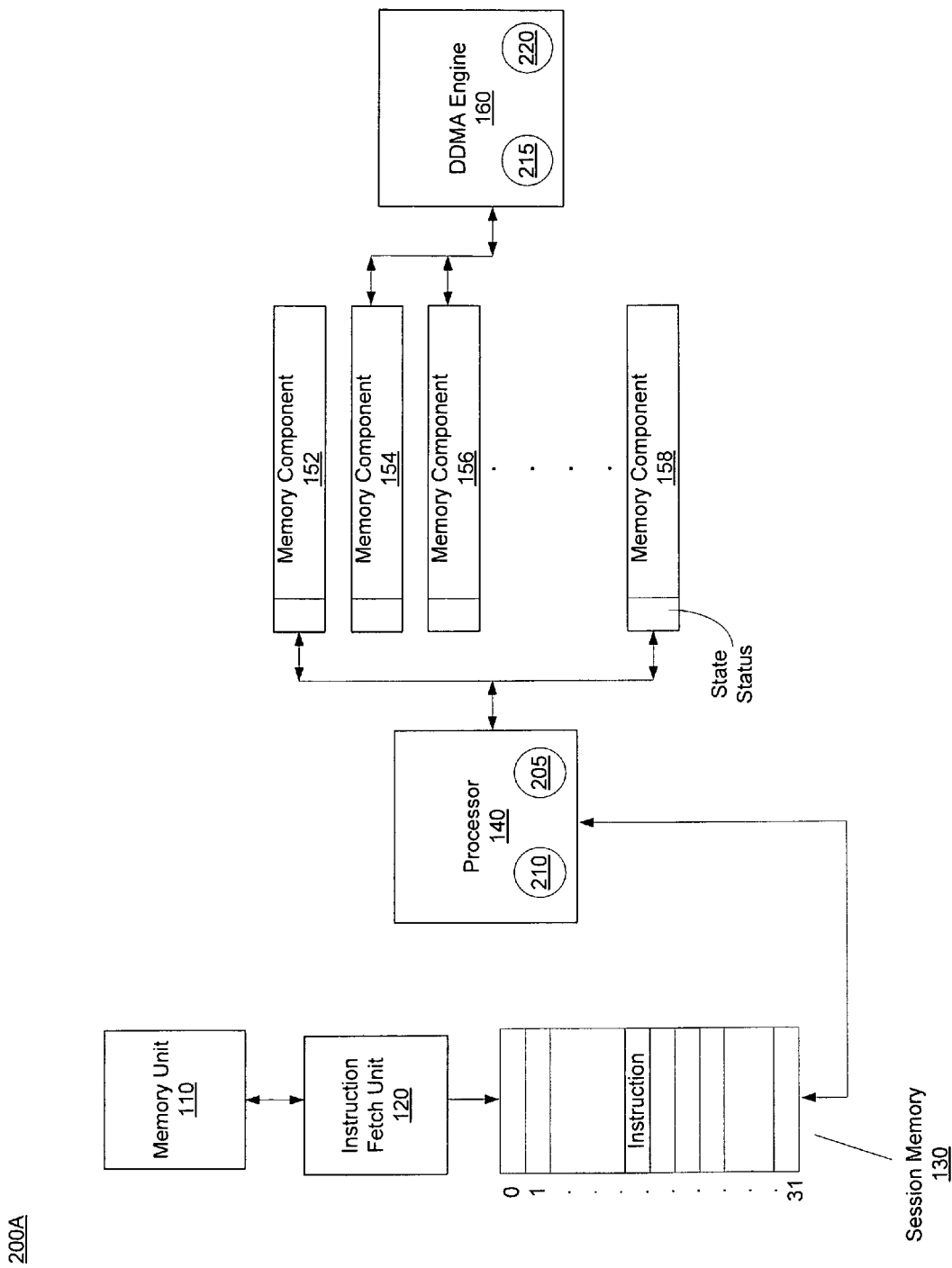
FIGS. 2A-2B show exemplary diagram representing the exchange of tokens in accordance with one embodiment of the present invention.
Figure 2B:
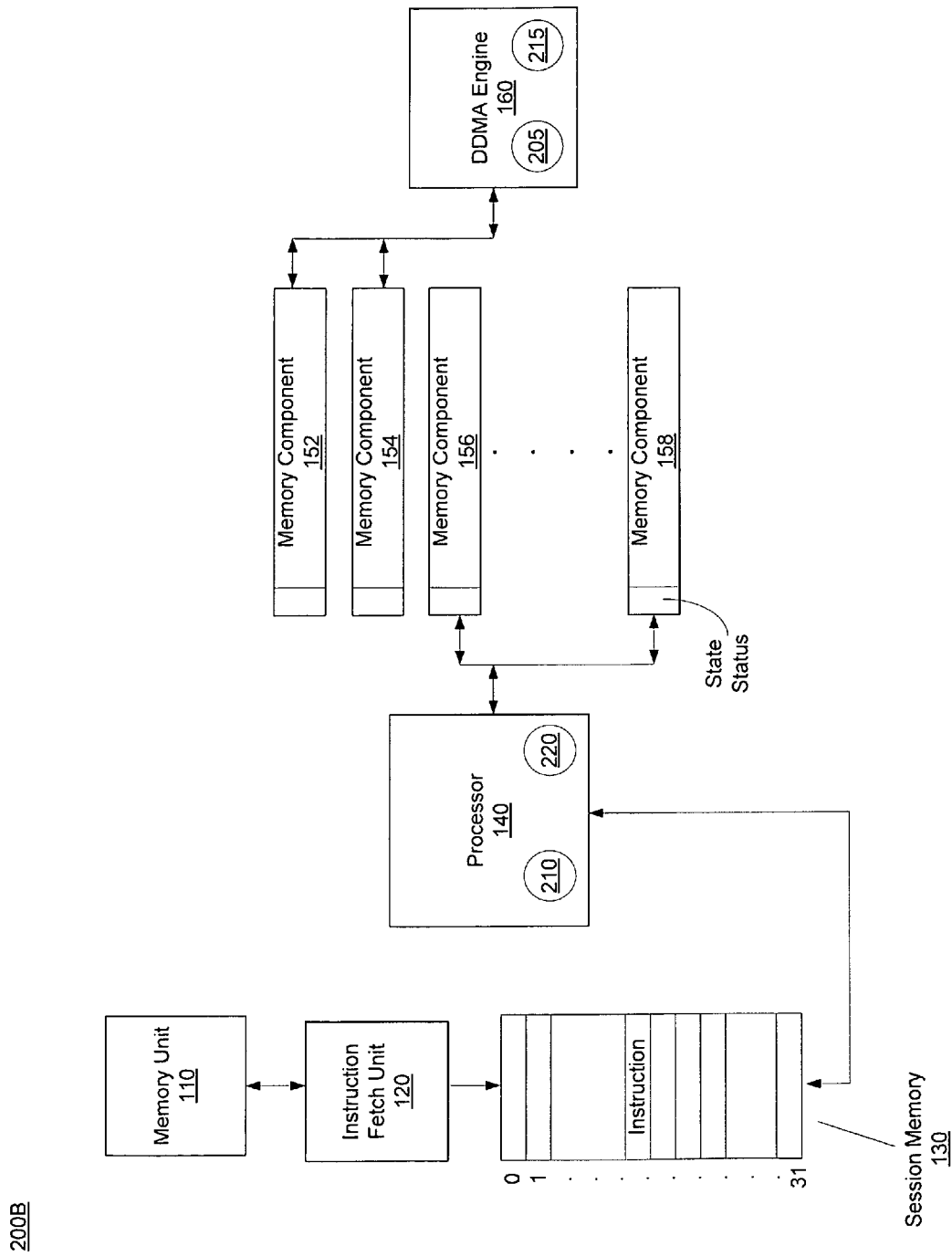

Referring now to FIGS. 2A-2B, an exemplary exchange of tokens in accordance with one embodiment of the present invention are shown. The system 200A is substantially similar to that of system 100. System 200A shows the processor 140 having possession of the token 205 and the token 210 associated with the memory components 152 and 158 respectively. Thus, the processor 140 has exclusive access to the memory components 152 and 158. The processor 140 maintains exclusive access to a memory component until the processor 140 releases the token associated with that memory component to the DDMA engine 160. For example, the processor 140 may load subcommands, e.g., a first subcommand and a fourth subcommand, in the memory components 152 and 158 respectively. The processor 140 may release the token 205 to the DDMA engine 160 when the processor 140 is done accessing the memory component 152.

During the time which the processor 140 is in possession of the 205 and the 210 tokens, the DDMA engine 160 may be in possession of the 215 and the 220 tokens associated with the memory components 154 and 156 respectively. Thus, the DDMA engine 160 has exclusive access to the memory components 154 and 156 until the DDMA engine 160 releases one or more of the tokens associated with the memory components to the processor 140. For example, the DDMA engine 160 may execute DMA operations to carryout a memory transfer and return the status data resulting thereof to the processor 140 by using memory components 154 and 156. The DDMA engine 160 may release the token 220 associated with the memory component 156 to the processor 140 when the DDMA engine 160 finishes accessing memory component 156.

It is appreciated that each memory component may have a state status associated therewith, e.g., allocated and processed by the processor, non-allocated, and processed by DDMA engine. State status can only be updated by the device having the token associated with that memory component.

Content of a memory component may be cleared or copied from other memory components in order to improve command issuance and command construction. It is also appreciated that content of a memory component may be loaded from a template in order to reduce the time associated with command issuance and command construction. For example, generic content may be stored in a template while specific content may be used to customize the generic content of the template, thereby making command construction easier. For example, op-codes of a complex commands are typically unchanged and may be stored in a template while an address for an operand of the op-codes may be loaded to customize the operation in order to improve command construction and reduce the time required to issue the command.

Referring now to FIG. 2B, token exchange between the processor 140 and the DDMA engine 160 in accordance with one embodiment of the present invention is shown. For example, the processor 140 may release the token 205 associated with the memory component 152 when the processor 140 completes accessing the memory component 152. For example, the processor 140 may release the token 205 to the DDMA engine 160 when the processor 140 completes loading the first subcommand in the memory component 152. Accordingly, the DDMA engine 160 may now possess the token 205, thereby providing the DDMA engine 160 with exclusive access to the memory component 152. Accordingly, the DDMA engine 160 may process the first subcommand loaded in the memory component 152. Status data resulting from processing the first subcommand may be loaded and stored in the memory component 152 by the DDMA engine 160.

On the other hand, the DDMA engine 160 may release the token 220 associated with memory component 156 when the DDMA engine 160 completes accessing the memory component 156. For example, the DDMA engine 160 may release the token 220 to the processor 140 when the DDMA engine 160 completes loading data in to the memory component 156. Accordingly, the processor 140 may now possess the token 220, thereby providing the processor 140 with exclusive access to the memory component 156.

The processor 140 may conclude that the third subcommand has been properly processed by the DDMA engine 160 when the processor 140 receives the token 220 back. By accessing the memory component 156, the processor 140 now has access to data resulting from the processing by the DDMA engine 160. In other embodiments, the token itself or the content of the memory component may indicate the status of the subcommand processed by the DDMA engine 160.

Accordingly, the processor 140 has exclusive access to some memory components while the DDMA engine 160 has exclusive access to other memory components. For example, the processor 140 is in possession of tokens 220 and the 210 associated with memory components 156 and 158 respectively, thereby giving the processor 140 exclusive access to the memory components 156 and 158. In a meanwhile, the DDMA engine 160 is in possession of the tokens 205 and the 215 associated with memory components 152 and 154 respectively, thereby giving the DDMA engine 160 exclusive access to memory components 152 and 154. Accordingly, resources of the processor 140 and the DDMA engine 160 are utilized simultaneously. As such, parallel processing for DMA offload increases, thereby improving the efficiency and data offload.

Figure 3:
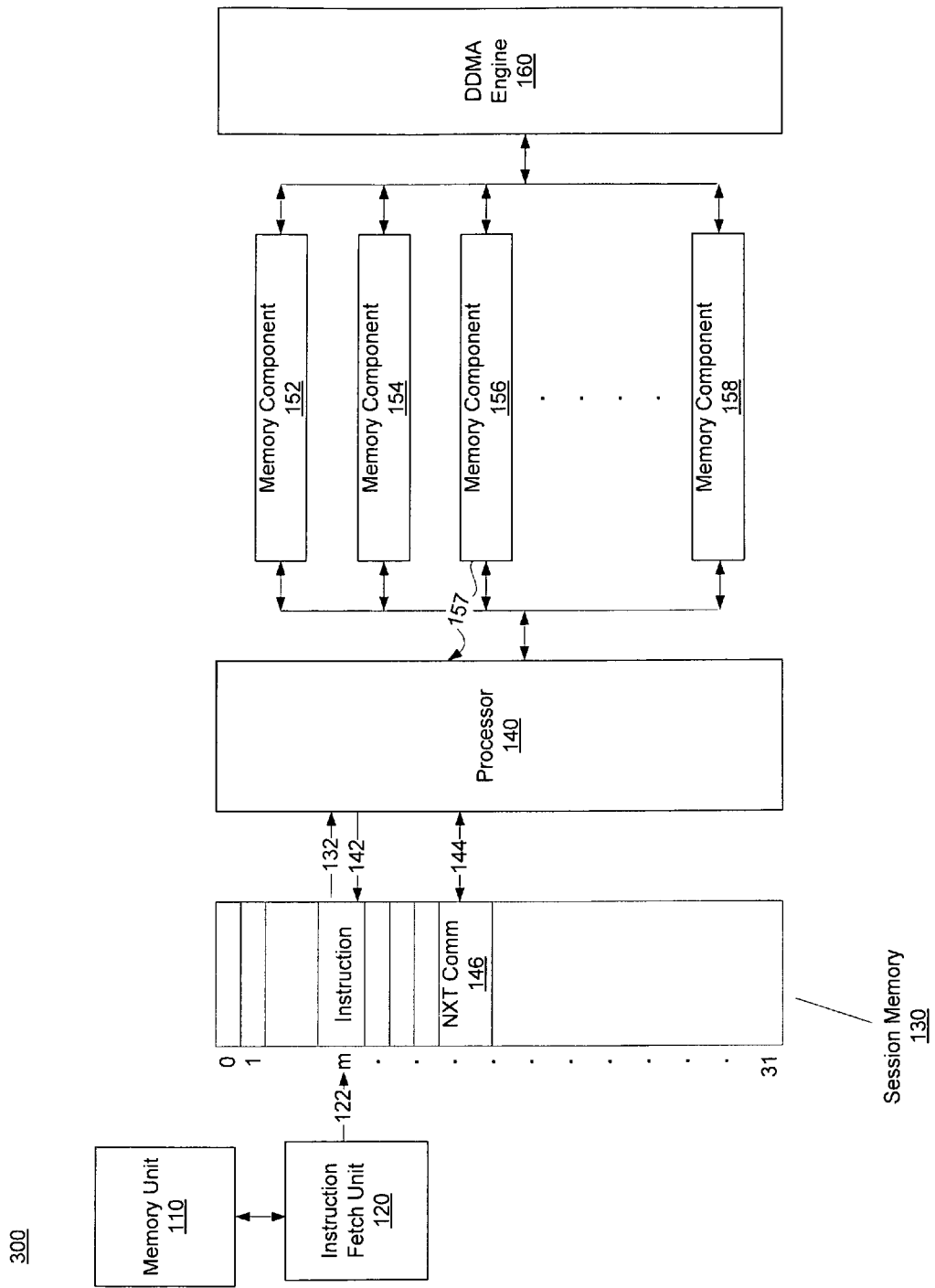
FIG. 3 shows an exemplary operation for completion of processing of an executable command in accordance with one embodiment of the present invention.

Referring now to FIG. 3, an exemplary operation for completion of processing of an executable command in accordance with one embodiment of the present invention is shown. The system 300 operates substantially similar to that of system 100. The processor 140 may select a command/instruction m based on an optimization heuristic. Accordingly, the instruction m is transmitted 132 to the processor 140. The processor 140 loads subcommands of the selected executable command m into various memory components. A token associated with a particular memory component is passed to the DDMA engine 160 as soon as the processor 140 completes accessing that particular memory component. It is appreciated that more than one token may be exchanged at a time.

As described above, the DDMA engine 160 has exclusive access to a particular memory component when the DDMA engine 160 has possession of the token associated therewith. It is appreciated that the DDMA engine 160 may have exclusive access to more than one memory component at a time. For example, the DDMA engine 160 may process, execute and/or modify more than one subcommand at a time. A token associated with a particular memory component is passed to the processor 140 as soon as the DDMA engine 160 completes accessing that particular memory component. It is appreciated that more than one token may be exchanged at a time. Moreover, it is appreciated that the processor 140 has access to some memory components while the DDMA engine 160 may have access to other memory components simultaneously, thereby increasing parallel processing in the system.

Accordingly, various tokens are exchanged between the processor 140 and the DDMA engine 160. The process of loading subcommands by the processor 140, exchanging tokens, modifying the content of memory components by the DDMA engine 160 and exchanging tokens again continues until the processor 140 detects that the last subcommand of the selected executable command is processed. For example, the processor 140 may receive a signal 157 indicating that the last subcommand is processed by the DDMA engine 160. In one example, the processor 140 may determine that the last subcommand has been processed by the DDMA engine 160 when the processor 140 receives the third token associated with memory component 156 containing data related to the last subcommand.

The processor 140 responsive to receiving the signal 157 that the last subcommand has been processed by the DDMA engine 160, sends a signal 142 to clear the executable command m stored in the session memory 130. It is appreciated that in response to clearing the executable command m stored in the session memory 130, the instruction fetch unit 120 may fetch the next executable command from the memory unit 110 and stores that command 122 in the session memory 130. The processor may select the next executable command 146 to be executed based on heuristic optimization. The selected command 146 is transmitted 144 to the processor 140 and is processed, in a similar manner.

Figure 4:
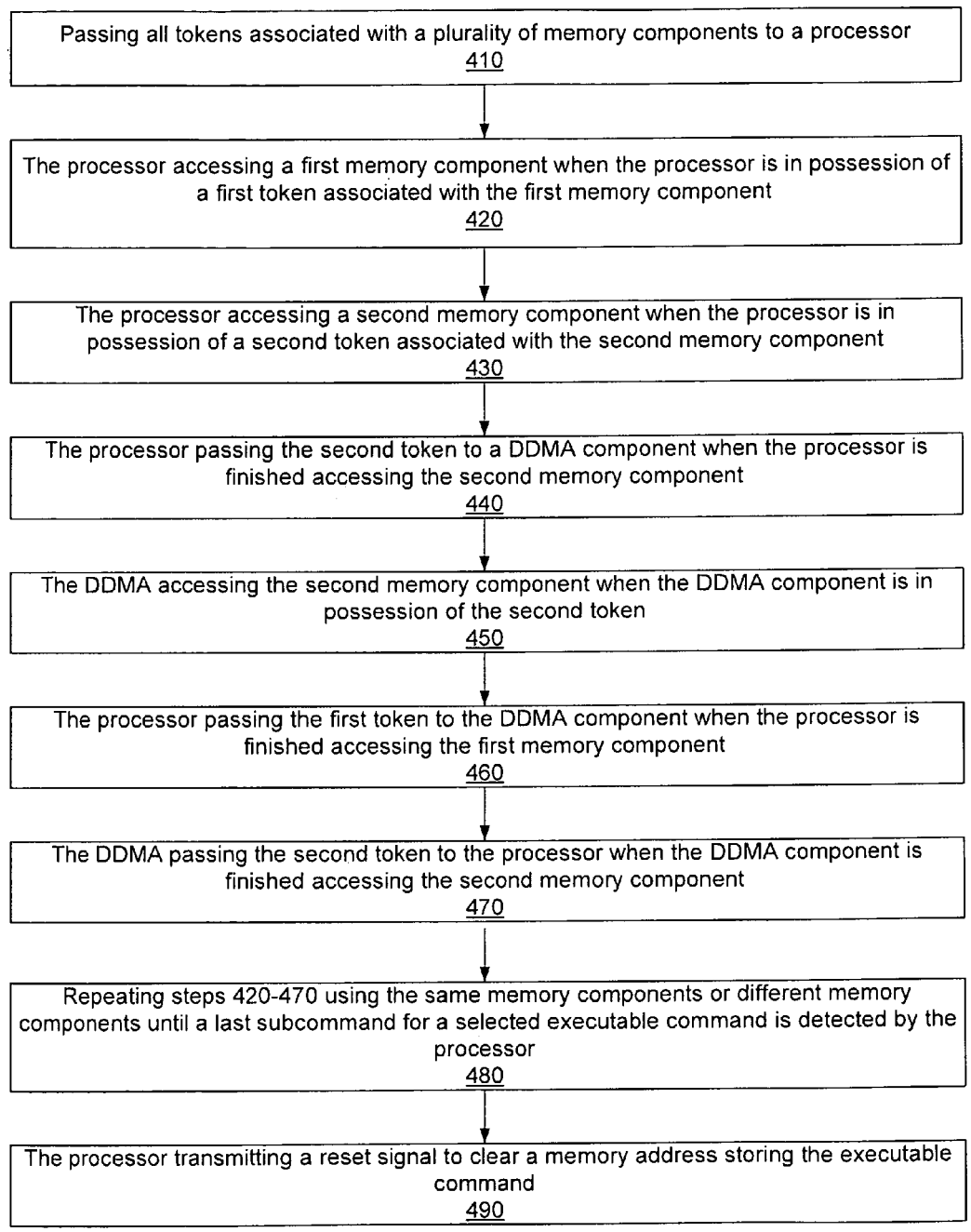
FIG. 4 shows an exemplary flow diagram in accordance with one embodiment of the present invention.

Referring now to FIG. 4, an exemplary flow diagram 400 in accordance with one embodiment of the present invention is shown. At step 410, all tokens associated with a plurality of memory components are given to the processor. Accordingly, the processor may start loading subcommands, commands and/or any combination thereof in to the memory components. For example, tokens associated with a first and a second memory components are respectively passed to the processor such that the first and the second subcommands can be loaded.

Accordingly, the processor has exclusive access to the first memory component when the processor has possession of the token associated with the first memory component. At step 420, the processor may access the first memory component when the processor is in possession of the token associated with the first memory component, e.g., load a first subcommand, a first command, etc. Similarly, the processor has exclusive access to the second memory component when the processor has possession of the token associated with the second memory component. Accordingly, at step 430, the processor may access the second memory component when the processor 140 is in possession of the token associated with the second memory component, e.g., load a second subcommand, a second command, etc.

The processor may pass a token associated with a memory component when the processor finishes accessing that memory component. For example, at step 440, the processor may pass the token associated with the second memory component to the DDMA component when the processor finishes accessing the second memory component, e.g., loading a second subcommand.

Accordingly, at step 450, the DDMA component accesses the second memory component during the time which the DDMA component has possession of the token associated with the second memory component. For example, the DDMA component may process, execute, encrypt, decrypt and/or modify the content, e.g., second subcommand, stored in the second memory component. In other words, the DDMA component may load data resulting from processing the second subcommand previously stored in the second memory component by the processor.

It is appreciated that the first memory component and the second memory component are operable to be used by the processor and the DDMA component simultaneously. In other words, the processor may continue loading subcommands in some of the memory components while the DDMA component may access and modify the content of other memory components simultaneously.

At step 460, the processor passes the token associated with the first memory component to the DDMA component when the processor completes accessing the first component. For example, the processor passes the token associated with the first memory component when the processor completes loading the first subcommand in to the first memory component. Possession of the token associated with the first memory component by the DDMA component provides the DDMA component with exclusive access to the first memory component. For example, the DDMA component may process and execute a DMA command to carryout a memory operation. The DDMA component may load data resulting from such processing back to the first memory component.

At step 470, the DDMA component may pass the token associated with the second memory component to the processor when the DDMA component completes accessing the second memory component. For example, the DDMA component may pass the token associated with the second memory component when the DDMA component completes loading data resulting from processing the second subcommand in the second memory component. Accordingly, possession of the token associated with the second memory component by the processor provides the processor exclusive access to the second memory component. Furthermore, when the processor receives the token back from the DDMA component, it may conclude that the subcommand previously loaded in the associated memory component has been processed by the DDMA component. In one embodiment, the token itself or the content of the memory component may indicate the status of a subcommand processed by the DDMA component.

It is appreciated that the order of process steps 440-470 are exemplary and not intended to limit the scope of the present invention. It is further appreciated that additional memory components may be similarly used. For example, eight memory components may be used to enable eight simultaneous operations between the processor and the DDMA component.

At step 480, process steps 420-470 may be repeated using the same memory components or different memory components until the last subcommand and/or the last command is processed. Processing of the last subcommand and/or command may be detected by the processor. At step 490, the processor may transmit a reset signal to a session memory storing the command just executed to clear that command. A new command may be stored to replace the executed command. A new executable command may be heuristically selected for execution by the processor.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system for improving direct memory access (DMA) offload comprising:
   a processor operable to select an executable command;
   a data DMA (DDMA) engine operable to execute a plurality of subcommands of said executable command; and
   a plurality of memory components operable to store said plurality of subcommands and data resulting from said DMA engine executing said plurality of subcommands, wherein each of said plurality of memory components has a corresponding token associated therewith, wherein possession of a respective token allocates its associated memory component to either said processor or said DDMA engine, and wherein said plurality of memory components are operable for use between said processor and said DDMA engine simultaneously, and wherein simultaneous access of said plurality of memory components between said processor and said DDMA engine is based on a corresponding respective token.

2. The system as described in claim 1, wherein each memory component comprises a state thereof and wherein a state of each memory component of said plurality of memory components is selected from a group comprising non-allocated, allocated and processed by said processor, and processed by said DDMA engine.

3. The system as described in claim 1, wherein said plurality of memory components is a set of registers and wherein said processor is a microcontroller.

4. The system as described in claim 1, wherein a first portion of content of a memory component of said plurality of memory components is operable to be copied from a different memory component of said plurality of memory components, and wherein a second portion of said content of a memory component is operable to be loaded from a template.

5. The system as described in claim 3, wherein a first token corresponding to a first memory component of said plurality of memory components is passed by said microcontroller to said DDMA engine when said microcontroller loads a subcommand in said first memory component, wherein possession of said first token by said DDMA engine enables said DDMA engine to execute a DMA command, and wherein said possession of said first token by said DDMA engine makes said first memory component inaccessible to said microcontroller.

6. The system as described in claim 5, wherein a second token corresponding to a second memory component is passed by said DDMA engine to said microcontroller when said DDMA engine loads status data in said second memory component, wherein possession of said second token by said microcontroller enables said microcontroller to access and modify content of said second memory component and make said second memory component inaccessible to said DDMA engine.

7. The system as described in claim 1, wherein said processor determines completion of execution of a last subcommand of said executable command, and wherein said processor in response thereto transmits a reset signal to clear a memory address storing said executable command.

8. A method of facilitating execution of memory access commands, said method comprising:

passing a first token associated with a first memory component of a plurality of memory components to a processor, wherein possession of said first token provides exclusive access to said first memory component during possession of said first token;

passing a second token associated with a second memory component of said plurality of memory components to a data DMA (DDMA) engine, wherein possession of said second token provides exclusive access to said second memory component during possession of said second token, wherein said first memory component and said second memory component are operable to be utilized by said processor and said DDMA engine simultaneously, and wherein simultaneous access of said first memory component and said second memory component between said processor and said DDMA engine is based on said first token and said second token respectively, loading a subcommand by said processor into said first memory component when said processor is in possession of said first token.

9. The method as described in claim 8 further comprising:
passing said first token to said DDMA engine when said processor completes using said first memory component, wherein possession of said first token by said DDMA engine provides said DDMA engine with exclusive access to said first memory component during possession of said first token.

10. The method as described in claim 8 further comprising:
said DDMA engine is operable to execute a DMA command related to a subcommand loaded by said processor, and wherein said DDMA engine is operable to load status data resulting from executing said DMA command to said second memory component when said DDMA engine is in possession of said second token.

11. The method as described in claim 10 further comprising:
passing said second token to said processor when said DDMA engine completes using said second memory component, wherein possession of said second token by said processor provides said processor with exclusive access to said second memory component during possession of said second token.

12. The method as described in claim 8, wherein said DDMA engine is operable to execute and operate on multiple subcommands of multiple memory components simultaneously.

13. The method as described in claim 8, wherein said plurality of memory components is a set of registers and wherein said processor is a microcontroller.

14. The method as described in claim 8, wherein a third memory component of said plurality of memory components is operable to be copied from a fourth memory component of said plurality of memory components.

15. The method as described in claim 8, wherein a portion of content of a memory component of said plurality of memory components is operable to be loaded from a template.

16. A system for facilitating execution of direct memory access (DMA) commands comprising:
   a session memory operable to store a plurality of commands;
   a microcontroller operable to select an executable command from said plurality of commands, wherein said executable command comprises a plurality of subcommands, and wherein a subcommand being currently executed is tracked;

a data DMA (DDMA) engine operable to process more than one subcommand of said plurality of subcommands simultaneously;

a first memory component of a plurality of memory components operable to be accessed by said microcontroller when said microcontroller possesses a first token associated with said first memory component; and a second memory component of said plurality of memory components operable to be accessed by said DDMA engine when said DDMA engine possesses a second token associated with said second memory component, wherein said plurality of memory components is operable to be accessed between said microcontroller and said DDMA engine simultaneously.

17. The system as described in claim 16, wherein said plurality of memory components is a set of registers.

18. The system as described in claim 16, wherein said first token is passed by said microcontroller to said DDMA engine when said microcontroller completes using said first memory component, wherein possession of said first token by said DDMA engine provides said DDMA engine with exclusive access to said first memory component during possession of said first token.

19. The system as described in claim 16, wherein said second token is passed by said DDMA engine to said microcontroller when said DDMA engine completes using said second memory component, wherein possession of said second token by said microcontroller provides said microcontroller with exclusive access to said second memory component during possession of said second token.

20. The system as described in claim 1, wherein possession of a respective token allocates its associated memory component exclusive access to either said processor or said DDMA engine.

* * * * *